United States Patent [19]

Gmür et al.

[11] Patent Number: 5,024,352
[45] Date of Patent: Jun. 18, 1991

[54] APPARATUS FOR THE AUTOMATIC DETERMINATION OF A CONTINUOUS BULK MATERIAL THROUGHPUT BY A CONTINUOUS BALANCE

[75] Inventors: Bruno Gmür, St. Gallen; Bernd Kühnemund, Flawil, both of Switzerland

[73] Assignee: Gebrueder Buehler AG, Uzwil, Switzerland

[21] Appl. No.: 484,351

[22] Filed: Feb. 22, 1990

Related U.S. Application Data

[63] Continuation of Ser. No. 948,350, filed as PCT EP86/00187 on Mar. 27, 1986, published as WO86/05875 on Oct. 9, 1986, Pat. No. 4,944,428.

[30] Foreign Application Priority Data

Apr. 4, 1985 [CH] Switzerland ............... 01485/85

[51] Int. Cl.⁵ ............................. G01G 11/14
[52] U.S. Cl. ............................. 222/1; 177/50; 222/55; 222/58; 222/77
[58] Field of Search ............... 222/77, 1, 55–58; 177/50

[56] References Cited

U.S. PATENT DOCUMENTS

| 3,124,206 | 3/1964 | Burke | 177/100 X |
| 3,135,427 | 6/1964 | Siegburg | 222/58 |
| 3,160,328 | 12/1964 | Rutherford | 222/41 X |
| 3,319,828 | 5/1967 | Maxwell | 222/58 X |
| 3,853,190 | 12/1974 | Delesdernier | 177/105 |
| 3,889,848 | 6/1975 | Ricciardi et al. | 222/58 |
| 4,756,348 | 7/1988 | Moller | 222/55 X |
| 4,756,698 | 7/1988 | Ladt et al. | 222/55 |
| 4,944,428 | 7/1990 | Gmur et al. | 222/55 |

FOREIGN PATENT DOCUMENTS

| 8501577 | 4/1985 | European Pat. Off. |  |
| 2013687 | 12/1971 | Fed. Rep. of Germany | 222/55 |
| 2384246 | 10/1978 | France |  |
| 2532748 | 3/1984 | France |  |
| 429214 | 7/1967 | Switzerland |  |
| 777464 | 11/1980 | U.S.S.R. | 222/55 |
| 2003625 | 3/1979 | United Kingdom | 222/55 |
| 2113856 | 8/1983 | United Kingdom |  |

OTHER PUBLICATIONS

Engineering, Band 223, Nr. 10, Oct. 1983 London (GB), "Electronically-Controlled Hopper Copes with Sticky Materials".

Technisches Messen, Band 47 Nr. 4, Apr. 1980, Munchen (DE), T. Albertz: "Massenstrommessung in Stauben", pp. 137–140.

Primary Examiner—Kevin P. Shaver
Attorney, Agent, or Firm—McAulay Fisher Nissen & Goldberg

[57] ABSTRACT

A method and apparatus for the automatic determination of a continuous bulk material through a continuous balance wherein a weighing vessel, an adjustable closure member movable in the weighing vessel for adjusting an outlet cross-section of the weighing vessel and an electronic weight difference measuring device are provided. The closure member provided in the outlet region of the vessel is so arranged that when the closure member is in the open operating position, there is a free mass flow in the weighing vessel and the bulk material flows freely and unhindered from the outlet of the weighing vessel. A control device is connected at its input to the weight measuring device and at its output to the adjustable closure member whereby a signal corresponding to the weight change in the weighing vessel per unit of time is produced, which is used for calculating the parameters of state of the bulk material flow.

17 Claims, 5 Drawing Sheets

APPARATUS FOR THE AUTOMATIC DETERMINATION OF A CONTINUOUS BULK MATERIAL THROUGHPUT BY A CONTINUOUS BALANCE

This is a continuation of application Ser. No. 948,350 filed as PCT EP86/00187 on Mar. 27, 1986, published as WO86/05875 on Oct. 9, 1986 now U.S. Pat. No. 4,944,428

BACKGROUND OF THE INVENTION

The invention relates to an apparatus for the automatic determination of a continuous bulk material throughput by means of a continuous balance, comprising a weighing vessel, an adjustable closure member for adjusting the outlet cross-section of the weighing vessel and electronic weight difference measuring means. The invention also relates to a process for the automatic determination of a bulk material throughput in such an apparatus.

Apparatus of the foregoing type have been known. For example, CH-A-557 060 discloses a process and an apparatus for the automatic determination of a bulk material flow. The basic idea used in this prior art is essentially based on the deflecting action of a butt or deflecting plate (baffle plate). Thus, if a falling bulk material flow is deflected by a butt or baffle plate placed in its line of fall, a momentum acts on said plate. The momentum force is dependent on the height of fall of the in each case instantaneous bulk material throughput and is also influenced by the position, shape and friction characteristics of the plate, but particularly by the bulk material behaviour. Other influencing parameters are the product granulation, flow behaviour, air and product moisture, temperature, etc. This list in itself shows that for the continuous determination of the mass flow of the flowing product very complex relationships are involved, despite the constructional simplicity of the actual baffle plate used. The problems which occur could only be solved in practice by accepting as invariable quantities certain framework conditions. Thus, the first restriction was that the deflecting plate system can only be used for really freely flowing material, such as grain. The product flow must be guided by geometrically constant conditions. It is theoretically conceivable to use the momentum established by the measuring or test plate for determining a bulk material throughput.

However, it has been found that the more practicable and appropriate way is to use the horizontal component of the momentum only, as is shown e.g. by DE-C-2 609 167 as a further development of the aforementioned CH-A-557 060.

The vertical component of the momentum, i.e. the "weight component", is eliminated in this type of test plate system by corresponding articulated supports for measured value determination. The horizontal deflection or the corresponding horizontal component from the interplay of the falling bulk material flow and the deflecting plate can in this way be used as a measured or test value for the automatic determination of the throughput of the bulk material flow.

Under laboratory conditions, this method makes it possible to obtain a measurement accuracy of ±0.5% and in very many cases ±1%. However, under more difficult conditions larger deviations individually appear. However, it is conventional practice to regularly guarantee bulk material balance accuracies of ±0.1%.

However, in all cases where balance accuracy is required, balances are still used although they are unable to measure a continuous bulk material flow and must instead interrupt the product flow for weighing purposes. In addition, balances are not only more expensive than systems with deflecting plates, but frequently need compensating elements, so that after the container balances a continuous product flow is obtained again. Conveyor scales or weighers with a high accuracy are even more expensive than container balances and often do not achieve the accuracy of the latter.

In the case of the presently observed intense automation efforts, particularly in mills, increasing importance is being attached to the following two points:

1. The product flow must have a maximum continuity with minimum fluctuation;

2. It must be possible to determine the throughput of the continuous product flow approximately with balance accuracy.

Of late, so-called differential balances have often been used, such as is e.g. shown by FR-A-2 456 344. The differential balance comprises a weighing container with a controlled product discharge, as well as a dosing means controlled by said container. The weighing container measures the material removed from the product discharge point or the running weight loss in the container. The measured results are in themselves very accurate, but a disadvantage of the known differential balances is that it is necessary to adhere to a regular sequence between filling and emptying. Although a discharge can take place during filling, the disadvantage then arises that during the filling phase the measured values of the balance are disturbed and rendered unusable by the inflowing product flow. For this purpose the aforementioned French specification proposes controlling the discharge member on the basis of a volumetric throughput during the filling phase. However, it is necessary to accept the corresponding errors.

In the case of fuel feeding of e.g. furnaces, less importance is attached to the accuracy than e.g. when processing foods in mills, particularly when determining the throughput of a grain flow, e.g. for the simultaneous precise dosing in of the missing water quantity, or for supplying and partly controlling processing machines.

A further problem in mills is the mixing of different grain types for which, hitherto, particularly high demands have not been made. However, this has changed through using computers for controlling the complete product flow, because the processed product quantity must be accurately determined, because otherwise over long periods there can be major differences between the actual grain quantities present in the individual storage compartments and the summated falsed data due to imprecise measurement. Corresponding to the number of storage compartments or product runs, a large number of throughput measuring points are required, so that the use of expensive weighing systems is not economically viable due to the large numbers necessary.

SUMMARY OF THE INVENTION

On the basis of this, the problem of the present invention is to develop a process and an apparatus for the continuous bulk material measuring method, which achieves the accuracy of balances and whose constructional dimensions are within the range of those in known deflecting plate systems.

According to the invention this is achieved in the case of an apparatus of the aforementioned type in that the closure member in the outlet region of the weighing vessel is connected thereto as an adjustable wall part and is positioned in such a way that a mass flow is obtained in the weighing vessel when the closure member is in the open operating position and that the bulk material flow can flow out freely and unhindered from the outlet cross-section of the weighing vessel.

In a process, the problem is solved in that whilst maintaining a mass flux in the complete weighing vessel or with a completely stopped mass flux a signal is derived which corresponds to the weight change of the weighing vessel occuring per unit of time and this is used for calculating the parameters of state of the bulk material flow.

The term "mass flux" is used to define the appearance of a closed, free flowing bulk material column, either in a tube or in a silo or silo outlet. The service provided by the invention is that it has recognized that considerable importance for the measuring accuracy of the complete apparatus is attached to the interplay of bulk material and weighing vessel.

If e.g. an hour glass is observed, a good regularity of the product outflow is observed. The conclusion was drawn from the accurate time cycle for the outflow that sand or a bulk material behaves in the same way as a liquid. However, in practice, many poorly or non-flowing hoppers revealed that bulk materials obey completely different laws to liquids.

The invention makes use of the outflow dimensioning, which has been known for some time in connection with silos. In silo technology two different outflow behaviours are differentiated, namely 1. the core flow and
2. the mass flow.

In the case of the "core flow" only the bulk material flows out which is located in the core zone, so that in the case of difficultly flowing bulk materials (e.g. flour), a cylindrical hole forms in the center of the silo cross-section and extends over the entire height of the silo filling. In this case the product flows in an irregular manner, but in the case of core flow a greater discharge capacity is regularly found than in the case of mass flow, because with the latter during discharge the complete bulk material quantity in the silo moves downwards. The invention has recognized that for the flow behaviour of most freely flowing bulk materials optimum conditions can be achieved if a mass flow is produced and this can flow freely and in an unimpeded manner out of the weighing vessel. In normal operation, the mass flow is constantly in movement in the weighing vessel and there is no need to constantly pass through the zone of rest or quiet and dynamic friction. Accelerations and decelerations in the vicinity of the outflowing mass flow no longer have a disturbing effect, because the complete product flow is passed along the wall and the resistance is less than in the interior of the product.

The known differential balances conventionally use mechanical force discharge means, such as screw conveyors or locks, which can be regulated to a precise dosing capacity by varying the speed. This leads to a damming up in the weighing vessel. The product only passes freely out of the forced feed means.

In an advantageous development of the inventive apparatus, the closure member is constructed as a wall part located in the outlet region of the weighing vessel in the form of a flap or slide valve. The flap or slide valve is arranged in such a way that with respect to their opposite wall parts for the operation of the apparatus, it is possible to set an aperture angle of 0° to 40° and in particularly preferred manner 20° to 35°.

According to a particularly preferred development of the inventive apparatus controllable adjusting means and position indicating means are associated with the closure member, such as the flap or slide valve. It is also advantageous for numerous applications to associate with the continuous balance a coarse or rough dosing member, which is controllable by said balance. In a particularly preferred manner said rough dosing member has a free mass flow, at least in the vicinity of its product outlet. This offers the advantage that there can be a uniform inflow to the continous weighing vessel. In the case of less easily freely flowing material, the rough dosing means can also comprise e.g. a lock or a screw dosing means.

The invention makes it possible to combine from the measuring technology standpoint for the first time two completely different operating states and, as will be shown hereinafter, whilst, if desired, simultaneously monitoring the inflow and outflow or separately determining from the measuring technology standpoint the inflow and outflow. Thus, it is possible for the first time to have a true control point within a continuous product flow, whilst simultaneously influencing the instananeous product throughput. As required, the product inflow or product outflow can be controlled or regulated.

Tests have shown that the final outflow process (i.e. when the product residues flow out of the balance), does not provide an accurate mass flow, so that preferably there is no drop below one third to one quarter filling of the weighing vessel for obtaining measured values. It is even possible to use the invention if the bulk material does not have a uniform density, moisture content, etc. It is particularly advantageous if the measured values are determined in a range of partial and complete filling of the continuous weighing vessel.

It is very advantageous in many applications if the signal is used for controlling the product supply to the weighing vessel. Thus, the bulk material quantity flowing into the weighing vessel can be "roughly" regulated on the basis of the measured values thereof, whilst the throughput is exactly regulatable in the region of the freely outflowing mass flow. Thus, it is possible to use on the inflow side any rough dosing apparatus, e.g. a dosing lock or a simple slide valve. The rough product flow is regulated in such a way that there is no rise above or drop below a maximum or minimum fill height in the weighing vessel. The actual weighing vessel is used as a type of "fine regulating device" for the throughput, if a given desired throughput value has to be set.

If there are changes in the flow characteristics of the bulk material which influence the mass flow, such as e.g. material density, moisture content, different mixing proportions, etc., the bulk material quantity flowing to the weighing vessel is preferably interrupted at intervals for checking purposes and the weight decrease of the balance content per unit of time is determined, so as to establish in this way the bulk material quantity which flows out per unit of time. Thus, it is possible to determine the exact measured values for the actual throughput or bulk material quantity which flows out and which is supplied to the production process, undisturbed by the product flowing into the weighing vessel. This can be set up in such a way that e.g. the actual values are obtained in kg/sec of the outflowing bulk material or correspondingly the through-flowing product quantity for a desired time interval.

It is particularly advantageous for the supply following processing machines if when brief fluctuations occur to the bulk material quantity flowing into the weighing vessel, the outflowing bulk material quantity is regulated in such a way that the weighing vessel due to varying filling acts as a balancing vessel and a "breaker" for instantaneously occurring changes, e.g. peaks.

In a particularly preferred manner, the derived signal is also used e.g. for regulating, such as the percentage dosing in of a second bulk material flow or a liquid component to be mixed with the first bulk material. If the product is suitable for forming a free mass flow, the signal can be used in the same way for controlling a following processing machine, e.g. for controlling the throughput capacity supplied by it.

In a further advantageous development of the inventive process, the mass flow in the weighing vessel is briefly stopped or the weighing vessel outlet is closed, thereby making it possible to establish the weight increase taking place per unit of time to the bulk material quantity flowing into the vessel. Two cases are possible, i.e. at the start of the product flow this makes it possible to very accurately determine in an immediate manner the instantaneous bulk material quantity fed into the weighing vessel, so as to e.g. control a rough dosing but, if necessary, or at particular time intervals, it is possible to accurately determine the product quantity fed into the weighing vessel. Advantageously part of the weighing vessel content is briefly drained off, the mass flow stopped or the weighing vessel outlet closed and, as in the first case, the product inflow is accurately determined on the basis of the weight rise per unit of time.

The above statements show that virtually any random combination is possible within the different development possibilities provided by the invention, as a function of the particular conditions which have to be fulfilled. Such conditions are e.g. the best possible levelling out of the product flow, an exact control to the throughput on the basis of a given desired value, the determination of exact instantaneous values for a proportional admixing of another component (e.g. wetting of grain), an exact determination of the bulk material quantity over a longer period, etc. and the invention is able to deal with these in a surprisingly simple and accurate manner. Further combinations are also possible, e.g. a rough regulation of the product flow by a controllable doser and a following exact measurement according to the invention, etc.

Thus, according to a further particularly preferred development of the inventive process the mass flow of the weighing vessel is briefly collected in a second weighing vessel and in the latter the weight increase per unit of time is determined and from the measured values of the first and second weighing vessels, it is possible to establish the bulk material quantity flowing into the first weighing vessel or the bulk material quantity flowing out of it.

BRIEF DESCRIPTION OF THE DRAWINGS

The invention is described in exemplified manner hereinafter relative to the drawings, wherein show.

DETAILED DESCRIPTION RELATIVE TO THE DRAWINGS

Figure 1:
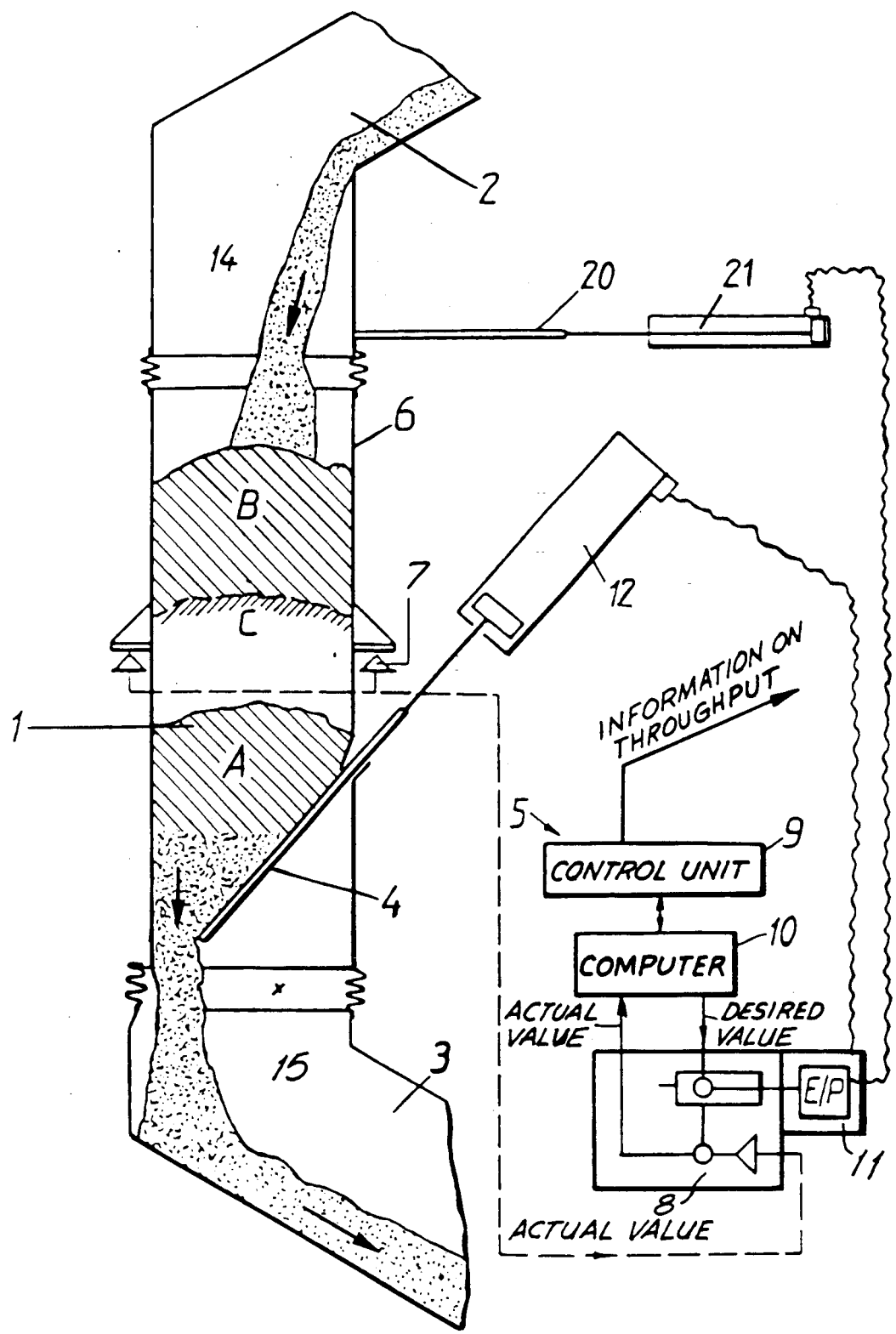
FIG. 1: A throughput measuring apparatus according to the invention.

FIG. 1 shows a weighing means provided in its upper region with a supply line 2, in its central region with a tubular balance 1 and in its lower region with a removal line 3. The tubular balance 1 is provided with a slide valve 4, by means of which the outlet from the tubular balance 1 can be opened or closed. There is also a computer unit 5 for utilizing the test signal supplied by the weighing means.

The main part of balance 1 is formed by the balance container 6, which is supported on pressure cells 7 or other elements suitable for the rapid determination of instantaneous weight values. The balance container 6 is in the present case so arranged and constructed that it forms part of the actual feedline, i.e. it is provided with a passage zone, whose cross-section precisely corresponds to the supply line 2 or removal line 3, the wall surfaces being directly connected to one another without disturbing the wall configuration as if the supply line, passage zone and removal line were a single part having the same cross-section. This ensures that the product coming from the supply line 2 can flow on into the removal line 3 without any disturbance caused by the internal cross-section of balance container 6.

The pressure cells 7 forward the signal produced by them and corresponding to the measured weight to a converter 8, which is connected via a control unit 9 to a computer 10. Converter 8 is also connected to an electropneumatic transducer 11, which is connected to a pneumatic cylinder 12 for controlling the cycle of balance 1. The represented arrangement permits a simple electronic determination of the measured weight values, as well as the passing on thereof to computer 10 for calculating the desired product throughput (product quantity per unit of time). It is also possible to provide a pressure compensating tube (not shown in FIG. 1) for eliminating those disturbance factors, which can occur because different pressure conditions can take place in the supply line 2 and the removal line 3. A pressure compensating tube connects an area 14 directly above the balance container 6 to an area 15 directly below the same in a free, undisturbed connection, independent of the position of the slide valve 4.

Figure 2:
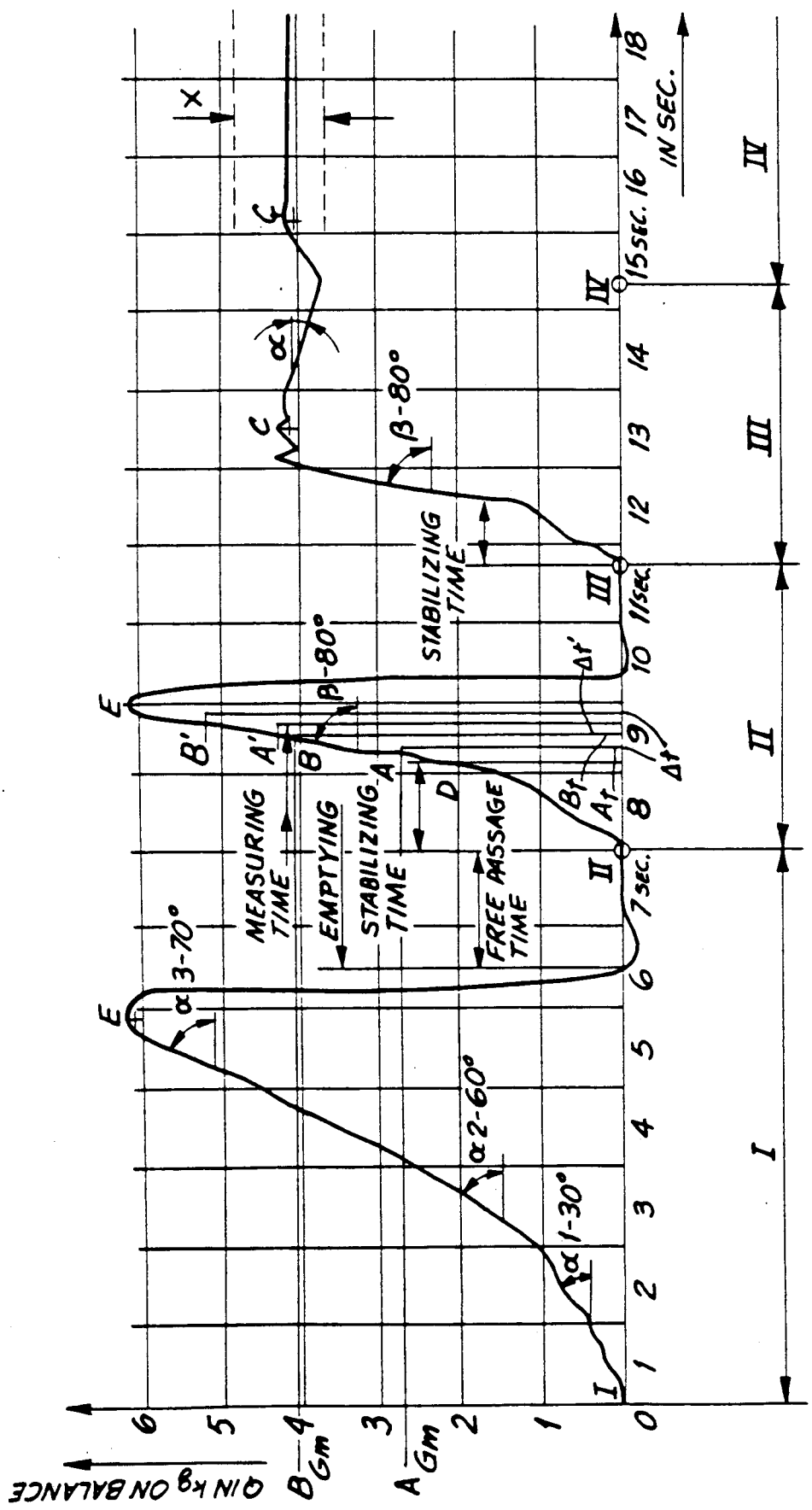
FIG. 2: An example of the course of the balance signal in a measuring apparatus according to FIG. 1.

FIG. 2 shows in exemplified manner four possible measuring cycles, such as occur in the case of first product runs, particularly with product types determined for the first time. FIG. 2 also shows four measuring cycles (determined throughput over time).

At the start of the measurement, slide valve 4 is operated in the closed position. The weighing container starts to fill and successively reaches fill positions A and then B. Measuring cycle I shows the frequently observed initial rise in the product supply. However, in measuring cycle II there is a stable infeed over the entire measuring time. The balance container is completely emptied again at the end of cycle II.

Measuring cycle III has two operating states. Up to the end of phase III, balance container is filled up to a middle filling position C and at the latter the slide valve is open to such an extent that the product quantity in the container remains constant, the slide valve being fixed in a corresponding position. Disturbance factors not determined by the balance give a slow emptying of the balance container, so that at the start of measuring cycle IV the slide valve position is somewhat more closed. During measuring cycle IV the product quantity in balance container is stabilized, which means that inflowing and outflowing bulk material quantities are approximately identical. Through corresponding, repeated, brief fixing of the position of the slide valve and regulating it to "inflow quantity equals outflow quantity", possible disturbances, which are e.g. outside a given band width X, are indicated directly or to a following processing machine.

FIG. 2 refers in more detailed manner to cycle II. The course of the measured weight increase Q in kg is shown in FIG. 2 over the time t in seconds. Time II indicates the closing time of the balance outlet, i.e. the completion of the closing movement of the slide valve 4. Balance container 6 starts to fill with the closing of slide valve 4 (time II), the produced weighing signal initially rising very irregularly and with definite overshoots or overswings corresponding to the curve from starting point II, because the complete balance system is made to oscillate here due to the first impact momentum and consequently overshoots or overswings.

However, in the case of good damping, after only a short time, in the represented example approximately 1 second, a stabilizing effect occurs, which roughly corresponds to point D. As from point D there is a linear rise of the measured values to point E and when the latter is reached the slide valve is opened. Corresponding to the outflow of product, the weight in balance 1 again drops to zero and due to the inertia effects which occur, briefly a negative weight signal is given. The slide valve then remains open for a certain time and is then closed again. Cycle II could be repeated randomly often after closure has taken place (repeat closing time of balance outlet or ended closing movement of slide valve 4).

It is important for the first determination of a constant throughput that in the region of the linear measured value rise, i.e. in the region between the stabilizing point D and the end point of the linear weight rise E at the start of the slide valve movement, that there are the measurements necessary for the inventive process with simultaneous time determination and in this way it is very accurately possible to establish the instantaneous throughput and the start of a stable supply. The very first measurement normally has no linear curve configuration corresponding to cycle I.

Point $A_t$ in cycle II is now the time associated with measuring point A and $A_{Gm}$ is the weight deviation measured by the balance. $B_t$ is the time associated with measuring point B and $B_{Gm}$ is the measured value for the weight determined at point B ("weight deviation"). A reading off of the measured value during the continued inflow of bulk material always determines both the weight and the momentum of the falling product flow in a simultaneous manner. Thus, such a single measurement can never represent the absolute weight of the bulk material instantaneously accumulated in weighing container 6.

Within the aforementioned linear range of the measured weight increase, there is now a measurement, e.g. between points A and B and this takes place over a very short reference time portion $\Delta t$.

All previous measurements and tests have confirmed that the weight indication error due to the momentum (rising momentum) is precisely identical to the corresponding value of the particular product afterflow (both vary in the same ratio during continuous filling of the container or on reducing the height of fall and therefore correspond to the afterflow), so that the two factors eliminate one another and the reading on the balance gives the in each case instantaneous throughput ($\dot{m}$ = mass flow per second), if the time change is calculated for the particular weight changes.

Thus, even when high precision is required, the weight difference between times $A_t$ and $B_t$ can be used as an adequately accurate difference value.

If the time-unit related weight of the bulk material flow which has flown into the balance is called the "bulk material throughput", this is obtained from the relation between the determined difference value on the one hand and the reference time portion on the other, in the following way and the quotient $$\frac{\Delta G}{\Delta t}$$

can also be given as the mass flow per second $= \dot{m}$ or as the pitch angle $\alpha(\beta, \gamma, \text{etc.})$ (or $\tan \alpha$):

$$\frac{B_{Gm} - A_{Gm}}{B_t - A_t} = \frac{\Delta G}{\Delta t} = \tan(\alpha, \beta, \gamma).$$

in which $\Delta G$ represents the weight difference and $\Delta t$ the reference time portion duration, $\alpha$, $\beta$ and $\gamma$ being the pitch angles of the measured curve (FIG. 2).

Thus, the measurement of the curve configuration within the reference time portion $\Delta t$ gives a short-term or time measurement from which, very accurately and precisely, it is possible to establish without difficulty the instantaneous bulk material throughput value. As can be gathered from FIG. 2, it is possible for an identical measurement to be performed in the zone of the linear measured value rise between points D and E not only during a reference time portion (points A-B), but also during a further reference time portion between points A' and B'. If the reference time portion $\Delta t$ is chosen as the same as between points A and B, then the throughput value, which can be derived from the second measurement, can be compared with the throughput value from the measurement during the first reference time portion and if a deviation exists a mean value can be formed which with even greater precision reproduces the averaged throughput between times $A_t$ and $B'_t$. If suitable weighing systems are used, there is no difficulty in performing numerous such individual measurements, in each case over an identical reference time portion $\Delta t$, within the linear measured value rise between points D and E and after each new measurement the previously determined throughput value can be corrected within the scope of a further averaging.

Over and beyond the calculation of the instantaneous throughput value, the aforementioned measurement of the weight difference $\Delta G$ and the reference time duration $\Delta t$ also permits, if desired, the very accurate determination of the total filling of the balance container 6 up to the emptying thereof, i.e. the product weight fed into container 6 between time II and point E. This can take place without difficulty in that the weight difference $\Delta G$ measured within a reference time portion is appropriately linearly extrapolated and calculated up, so that the weight difference between point E on the one hand and intersection II of the lines of the linear measured value rise with the abscissa (time axis) on the other is calculated. This weight difference is then a very accurate determination of the weight of the bulk material which has actually flown into the container, as can be proved by test results. If an electronic balance is used for measured value determination and which simultaneously permits an integral evaluation of the measured value curve over time, it is even possible to replace the curve measured by a suitable electronic circuit for calculating the throughput or the bulk material weight fed into the balance container by a curve formed from a line e.g. passing through point E, in which the integral over the time between its intersection with the abscissa and point E is equal to the integral of the actually measured curve over the time between points I and E.

Obviously cycles I and II can be omitted, starting directly with cycle III. However, then there is no adequate certainty that the throughputs determined by the computer coincide with balance accuracy. The first measurement simultaneously serves for the calibration for the particular operating state or for a not yet known product. If desired, this calibration can be repeated during operation, if a brief interruption of the product flow is permitted.

The solution according to FIG. 1 permits a constant determination of the throughput, permitting permanent monitoring of the product flow. On provision of an adequate band width, this also makes it possible to level out or improve the constancy of the throughput. Fluctuations or brief peaks to the product fed into the balance container are detected therein. The product quantity discharged at the bottom is considerably balanced out over the time, which in turn has an influence on the accuracy of determining the throughput. In FIG. 1 slide valve 4 is controlled by measured values of the balance signals and from the latter the product throughput is determined.

Figure 3:
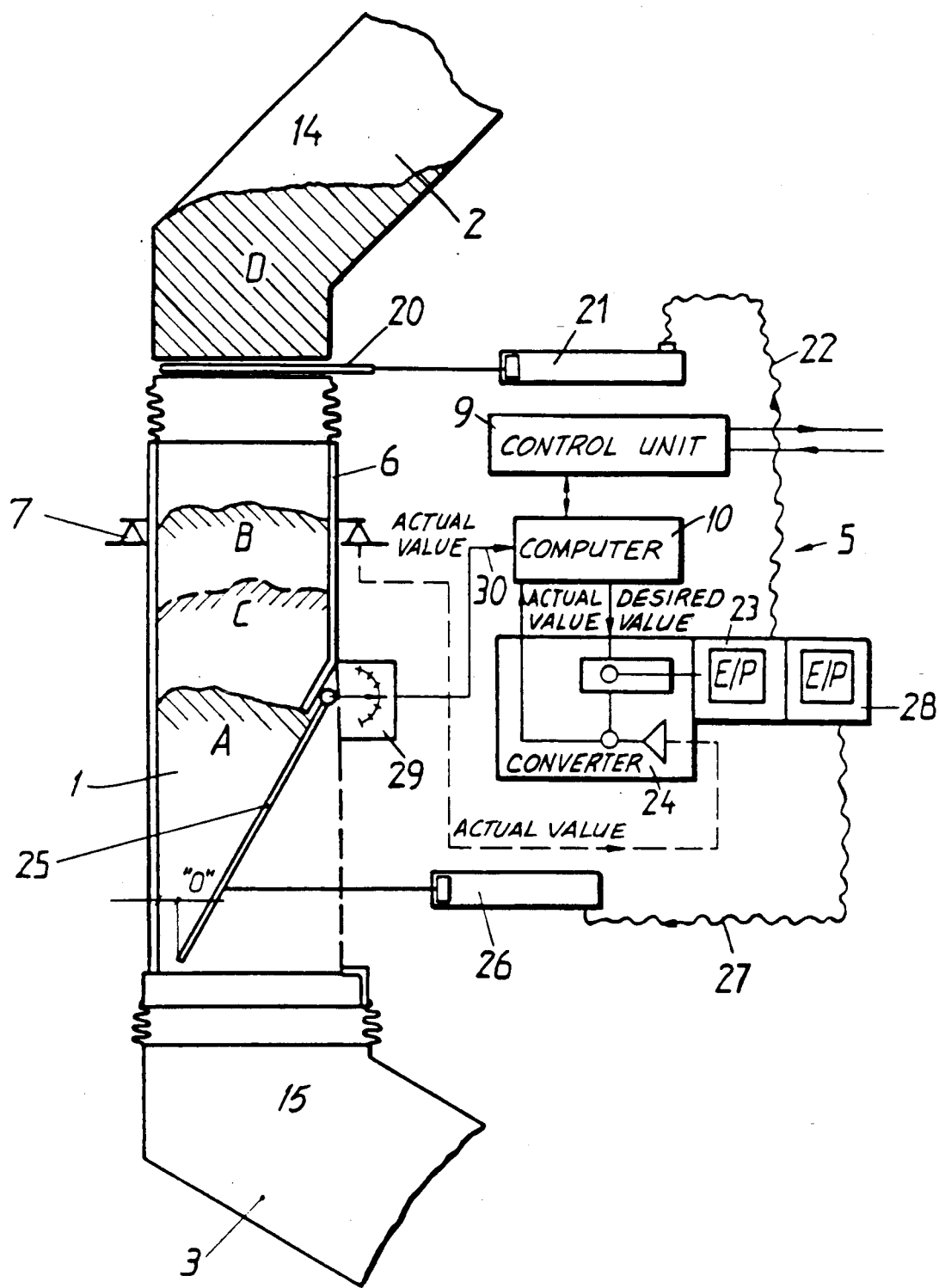
FIG. 3: A different inventive throughput measuring apparatus with rough control of the inflowing product.

In both FIGS. 1 and 3, a product slider 20 is arranged in supply line 2 and it is operated by means of a pneumatic cylinder 21. Pneumatic cylinder 21 is controlled in an appropriate manner, such as is shown in FIG. 3 by means of an air line 22 and an electropneumatic transducer 23, which receives correction signals from a converter 24.

It is advantageous for certain products to use in place of a flat slider at the outlet of the tubular balance a swing flap 25, which is operated by means of electromotive means, e.g. a servomotor or, as shown in FIG. 3, a pneumatic cylinder 26, which is supplied and controlled by compressed air via a control line 27 and an electropneumatic transducer 28. A position indicator 29, which can e.g. be constructed as a rotary potentiometer is also connected to the swing flap 25. The corresponding electric signal is supplied to the computer 10 by means of a control line 30, which in each case determines the actual position of the swing flap 25.

The arrangement according to FIG. 3 can be operated in the same way as that according to FIG. 1, the product slider being used as a service slider.

However, the arrangement according to FIG. 3 also permits another operating mode, in that it can be operated as a type of differential balance, but unlike in the known differential balances, in each case in the weighing container 6 a free mass flow and simultaneously a free product outlet are permitted. So that no disturbance factors due to changed frictional and accelerational forces disturb the result, the open position δ is always set in such a way that there is no drop below a product quantity A in the weighing or balance container. Tests have shown that in the case of a correct shaping of the complete container, particularly the outflow part, as from a given product quantity A a change to the fill height in the area between A and B has no influence on the outflow velocity at the balance outlet and in particular said velocity is not disturbed no matter whether or not product is flowing in the weighing vessel.

As a function of the product and the particular situation, it is possible to pour e.g. in a cycle of 2 seconds a large amount of product, e.g. quantity B—quantity A into the weighing or balance vessel in the case of simultaneous discharge with a given capacity. After 2 seconds, slider 20 is completely closed and the continuous discharge of the product over time is monitored, regulated and measured for 8 seconds and then the cycle is repeated. This has the advantage that at least during the greater time portion, the outflowing product quantity is determined in undisturbed manner with balance accuracy. As can be gathered from FIG. 4, as soon as a certain regularity with respect to the infeed has been reached, much information can be obtained.

The start of the measurement can take place through a cycle X, corresponding to cycle II in FIG. 2. In this way, the computer can determine the product quantity flowing into the balance per unit of time or the throughput ($\dot{m}$) and on reaching the fill height B the flap 25 can open in a corresponding power or capacity position. Simultaneously slider 20 is closed as cycle XI continuously determines the discharge capacity or the container weight decreasing over time and from it calculates the mass flow ($\dot{m}$). At the end of the phase of cycle XI, slider 20 is opened again, so that initially the product mass which has accumulated above it drops into the balance. Following an initial steep rise, a shallower rise on the balance signal establishes the normal afterflow from supply line 2. On reaching fill height B, slider 20 is closed again and cycles X and XI are repeated.

Slider 20 can be replaced by a feed screw or a lock permitting a corresponding controlability of the product flow.

Figure 4:
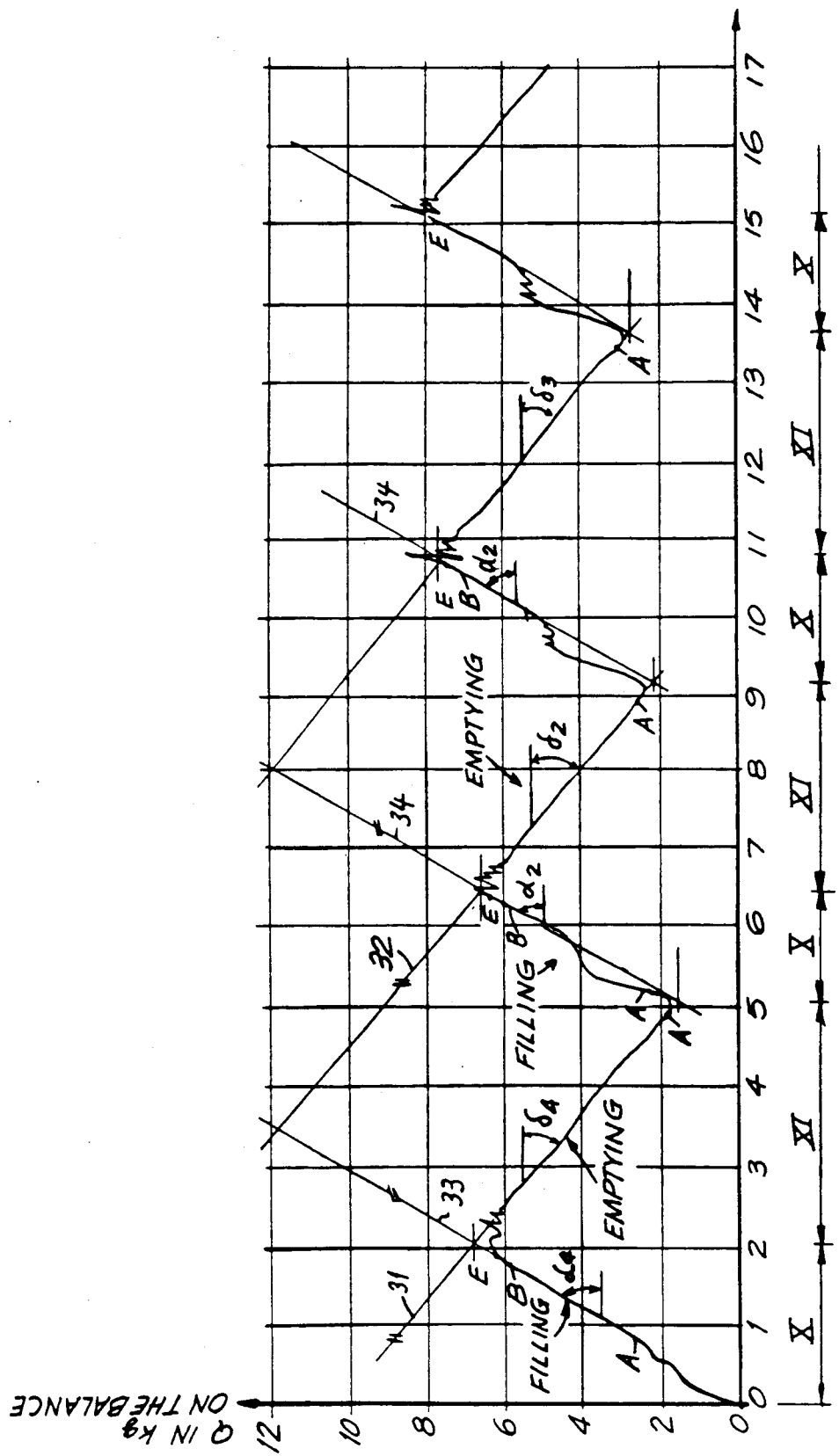
FIG. 4: An example of the course of a balance signal in an apparatus according to FIG. 3.

It is also assumed in FIG. 4 that the product discharge from the balance container in the two cycles XI is either constant or is regulated to a constant value, so that the two lines 31, 32 are parallels. By calculating the idealized "sensing lines" 33, 34, very accurate conclusions can be drawn on the particular infill quantity, although the corresponding values cannot be directly determined by the balance due to the product flow falling in (fall momentum).

In this way, following a number of unchanged cycles XI, a small correction for the discharge capacity can be fed into the supply line 2, as a function of whether there was too much or too little. This is particularly advantageous for determining the throughput in the directly following processing machines, because only control corrections at longer time intervals are required both for the machine and for possible further admixtures.

Figure 5:
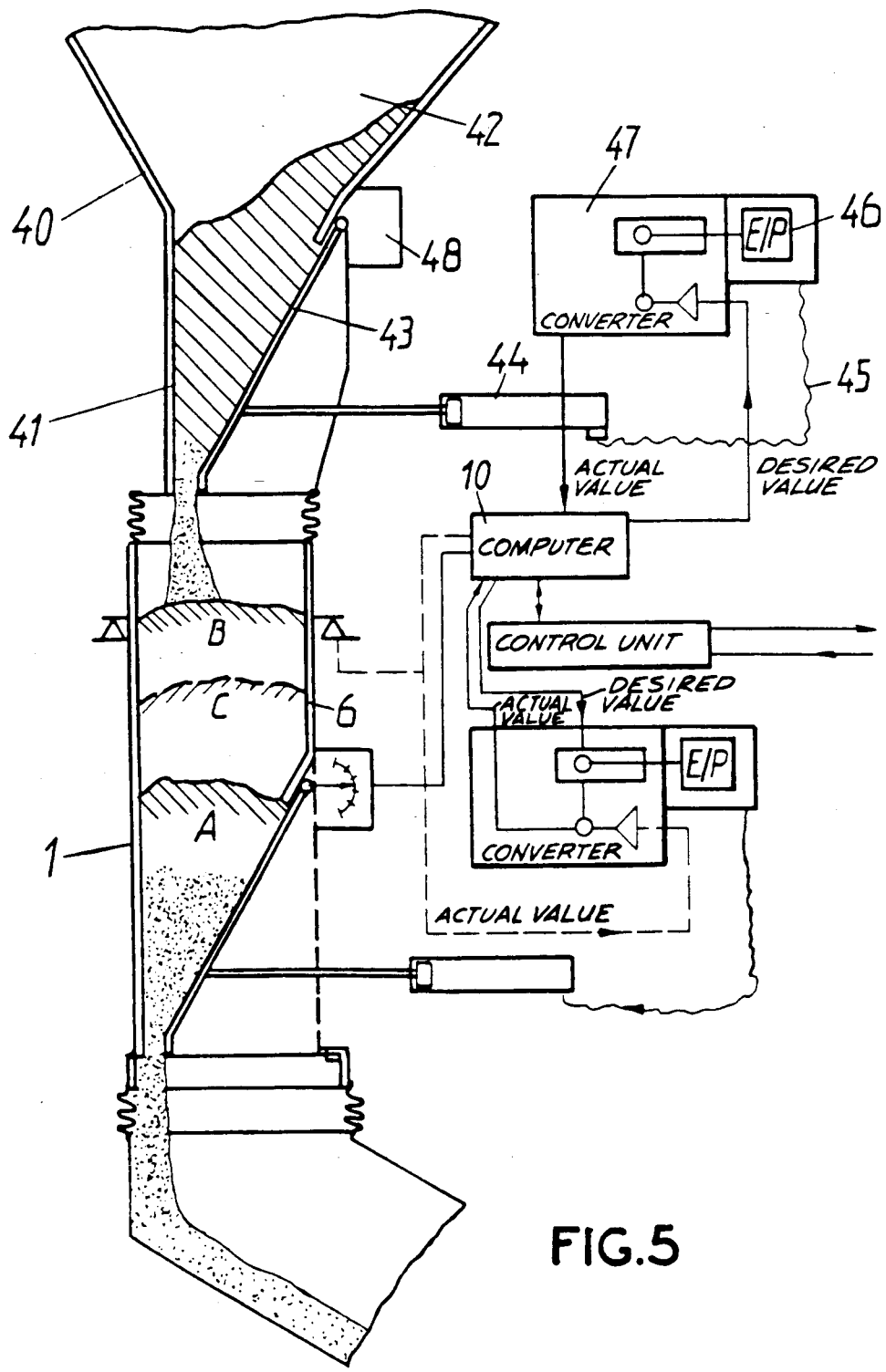
FIG. 5: Another example of an inventive throughput measuring and regulating apparatus.

The arrangement according to FIG. 5 differs from the constructions according to FIGS. 1 and 3 with regards to the product supply. In FIG. 5 the balance vessel is supplied directly from a storage bunker or silo. The problem here is to maintain constant a given desired value. The product throughput is to be regulated to balance accuracy over the complete processing period (e.g. ±0.2%; ±0.1% accuracy). The accuracy is to be maintained both instantaneously and as a sum over the processing period.

Over the balance container 6 is positioned a silo or storage container 40, downstream of which is connected a regulatable discharge dosing means 41, which can be any known dosing means, as a function of the flow characteristics of the product. In the case of freely flowing products, such as grain, it has proved to be particularly advantageous not only to dimension in per se known manner as free mass flow silos the silo or container part 42, but also for the discharge dosing member to be in the form of a free mass flow dosing means with free product discharge, as shown in FIG. 5. The discharge dosing means has the function of a rough dosing means and is provided on the side with a regulating flap 43, which is operated by means of a pneumatic cylinder 44 or a corresponding diaphragm. The compressed air signals are transferred from an electropneumatic transducer 46 via a compressed air line 45. Computer 10 supplies a converter 47 whith the required predetermined set values, which are used for an initial rough setting by means of a position indicator 48. During operation the correction instructions for the coarse dosing means can be selected in such a way that the extent of the variations between fill heights A and B in balance container 6 can be fully utilized.

The construction according to FIG. 5 also permits a direct regulation of the discharge dosing means 41, in that there is a continuous determination of the extent of the weight increase over time, starting from a fill quantity A and a corresponding control signal is supplied by the computer 10 and via converter 47 to the pneumatic cylinder 44. A curve B corresponding to cycle I in FIG. 2 is then obtained. If a container filling is not sufficient for a precise discovery of the desired dosing capacity, this process is repeated, as in FIG. 2, giving a cycle III in 11 to 13 seconds. At 13 seconds the flap 25 is open sufficiently wide to ensure a constant weight in the balance container. The corresponding slider position is now held. Due to the free mass flow the discharge capacity from the balance container remains constant with balance accuracy and the fill quantity in the container is, as described hereinbefore, regulated through the rough dosing flap 43 by means of a corresponding desired signal from computer 10.

However, in computer 10 there can also be random programs for product-dependent opening with respect to a desired throughput, the capacity over time advantageously corresponding to a quadratic function. If the continuous balance is fitted in slightly sloping manner, instead of vertically, corresponding actual value correction programs can be provided in computer 10.

The above comments show that computer 10 can be programmed in any appropriate manner and, as a function of requirements, the following data can be fed in or received in random combination:

the instantaneous throughput;

the totalizing of the product quantity, e.g. for a cycle time of 10 seconds;

the totalizing of the product quantity based on one or several hours;

in each case a fixed weight momentum, i.e. an effective (calculated time) indication, when a given product weight of e.g. 50 kg has flown through and/or a given processing quantity of e.g. 50 t.

As stated, it was not hitherto possible to obtain in one system the corresponding data with balance accuracy and constant product flow, because although batch scales operate very accurately, they in each case only suddenly pour out a given quantity of e.g. 50 kg. All systems with baffle plates do not reach the required accuracies. Band-type balances are not economically acceptable in many cases and only reach the necessary accuracy in the case of very high maintenance expenditure.

For example, the Jenike process can be used for calculating and dimensioning the vessel, as well as the flap or slider for producing a free mass flow.

In 1954, A. W. Jenike (cf. Bulletin no. 64 of the Utah Engineering Experiment Station, University of Utah, 1954 and Bulletin no. 123 of the Utah Engineering Experiment Station, University of Utah, 1964) developed an experimental testing method for determining the vital material quantities (internal friction angle of the bulk materials, as well as friction values of the latter with respect to different wall materials, etc.) with the aid of which it was possible to determine outflow shapes and outlet quantities for container outlets ensuring a trouble free mass flow under gravity action.

For this purpose corresponding bulk material patterns are measured in a shear apparatus. The core of the apparatus consists of the shear cell known from soil mechanics, in which bulk material samples with different normal loads are compacted and are sheared under these compaction states. The graphical evaluation of the measured results, together with the calculations of higher differential equations given by Jenike make it possible for each bulk material/wool material pair to give the in each case necessary inclinations of the sloping faces, as well as the minimum outlet dimensions, so that the mass flow is guaranteed.

In the case of mechanical discharge members, which keep closed or completely cover the bottom area of the weighing vessel, the different movements (rotation, oscillating, pulsating, etc.) have disturbing influences on the instantaneous weighing result. However, there are no weight differences due to different degrees of opening of the discharge cross-sections because in the case of mechanical discharge members there is no direct influence on the weight value as a result of the pressure on the bottom or the vessel walls.

Differing therefrom, e.g. in the case of a liquid weighing and with an in part free bottom outlet, there is a corresponding reduction to the effective bottom surface when determining the weight value.

Tests have shown that quite different conditions with respect to the instantaneous weight readings occur with differing freeing of the projected base surface of the weighing vessel in the case of bulk materials, because bulk material has a completely different behaviour to liquids. Unlike liquids, bulk material leads to friction, so that there are tension rearrangements in the outlet region during discharge. Thus, constant conditions occur, which can be detected by calibration and therefore very accurately reproducible values of each measurement can be obtained.

We claim:

1. Process for automatic determination of a bulk material flow throughput through a continuous balance and comprising the steps of feeding a bulk material into a weighing vessel of the continuous balance, providing an adjustable closure member in an outlet region of said weighing vessel as a movable wall part of said vessel and adjusting a size and a shape of an outlet opening of said weighing vessel by moving said adjustable closure member to position the adjustable closure member in said weighing vessel, said outlet region defining a substantially vertical pathway of said vessel for the bulk material flow and said movable wall part having a vertical component which partially defines said pathway; providing measuring means on said vessel and measuring the weight of said weighing vessel while feeding the bulk material into the weighing vessel, controlling the throughput of bulk material by control means which operatively interconnect said weight measuring means and said adjustable closure member, and controlling the adjustable closure member to provide a continuous mass flow of material through of said weighing vessel while simultaneously measuring the weight of said weighing vessel.

2. Process according to claim 1, wherein said parameter signal is used for controlling the bulk material supply to an input to said weighing vessel.

3. Process according to claim 1, wherein the bulk material flow to said weighing vessel is interrupted during predetermined time intervals to determine the weight decrease of said weighing vessel and thereby determining the quantity of material flowing from said weighing vessel as a function of time.

4. Process according to claim 1, wherein, for compensating brief fluctuations of quantity of bulk material flowing to said weighing vessel, said weighing vessel is used as a compensating vessel.

5. Process according to claim 1, wherein said mass flow through said weighing vessel is briefly supplied to and collected in a second weighing vessel and further including the steps of establishing weight increase per unit time in said second weighing vessel due to bulk material flow therein, and calculating from the measured values of said second weighing vessel the bulk material quantity flowing through said first weighing vessel.

6. Process according to claim 1, wherein at least one determining parameter signal of the bulk material is derived from weight measurements in said measuring step.

7. Process according to claim 6, wherein said at least one determining parameter signal regulates a second product flow for mixing with said bulk material.

8. Process according to claim 6, wherein said at least one determining parameter signal controls a processing machine following said continuous balance.

9. Process according to claim 6, wherein said mass flow in said weighing vessel is briefly stopped by closing the outlet opening thereof, and wherein the increase in weight of the bulk material fed into said weighing vessel is determined.

10. Apparatus for automatic determination of throughput of a bulk material through a continuous balance, comprising:
 a. a weighing vessel having an inlet opening for receiving bulk material and an outlet opening;
 b. weight measuring means having an input and an output, said input being operatively connected with said weighing vessel;
 c. adjustable closure means being positioned in an outlet region of said weighing vessel for closing and opening the outlet opening of said weighing vessel, said outlet region defining a substantially vertical pathway for the flow of bulk material, said closure means including a closure member forming an adjustable movable wall part of the weighing vessel, said closure means further including means for moving said closure member between a plurality of positions between opened and closed positions for adjusting said outlet opening of said weighing vessel to a shape and a size thereof to ensure, in its opened positions, a continuous mass flow of said bulk material through said weighing vessel; said movable wall part of said closure member having a vertical component which partially defines said pathway for the flow of bulk material; and
 d. control means having a program for controlling throughput of bulk material, said control means having an input and an output, said input of said control means being operatively connected with said output of said weight measuring means, while said output of said control means is operatively connected with said means for moving the closure member within said weighing vessel.

11. Apparatus according to claim 10, wherein said adjustable wall part is mounted for rectilinearly movement.

12. Apparatus according to claim 10, wherein said adjustable wall part is mounted for pivotal movement.

13. Apparatus according to claim 10, further including position indicating means connected with said movable wall part for indicating the position of the wall part.

14. Apparatus according to claim 10, wherein the closure member is mounted for pivotal movement and said means for moving adjusts said wall part at angles between 0° and 40° relative to a wall of said weighing vessel.

15. Apparatus according to claim 10, further including a dosing member positioned upstream of said weighing vessel and adapted for control by the continuous balance as a function of weight changes monitored by said weight measuring means.

16. Apparatus according to claim 10, further including a supply line and a removal line, wherein
 a portion of said supply line is positioned at a distance above said weighing vessel;
 a portion of said removal line is positioned at a distance below said weighing vessel;
 passage zones of said portion of said supply line, said portion of said removal line and said weighing vessel have essentially the same cross section; and
 said portions of said supply and removal lines and said weighing vessel are aligned with each other to form a feed line.

17. Apparatus according to claim 10, wherein said weighing vessel rests on said weight measuring means which are electronic weight measuring means.

* * * * *